United States Patent
Snider et al.

(10) Patent No.: US 9,398,116 B2
(45) Date of Patent: Jul. 19, 2016

(54) CACHING MODEL FOR IN-VEHICLE-INFOTAINMENT SYSTEMS WITH UNRELIABLE DATA CONNECTIONS

(71) Applicant: CloudCar Inc., Los Altos, CA (US)

(72) Inventors: Peter J Snider, Redwood City, CA (US); Zarko Draganic, Belvedere, CA (US)

(73) Assignee: CloudCar, Inc., East Palo Alto, CA (US)

( * ) Notice: Subject to any disclaimer, the term of this patent is extended or adjusted under 35 U.S.C. 154(b) by 21 days.

(21) Appl. No.: 14/138,097

(22) Filed: Dec. 22, 2013

(65) Prior Publication Data

US 2015/0181417 A1    Jun. 25, 2015

(51) Int. Cl.
*H04W 4/00* (2009.01)
*H04L 29/06* (2006.01)
*H04L 29/08* (2006.01)

(52) U.S. Cl.
CPC .............. *H04L 67/42* (2013.01); *H04L 67/125* (2013.01); *H04W 4/001* (2013.01)

(58) Field of Classification Search
USPC .......... 370/338, 328, 329, 465, 389; 455/345, 455/466, 557, 556.1, 420; 719/313, 311, 719/204, 206
See application file for complete search history.

(56) References Cited

U.S. PATENT DOCUMENTS

| | | | |
|---|---|---|---|
| 8,392,394 B1 * | 3/2013 | Kumar | G06F 17/30864 707/706 |
| 2002/0098853 A1 * | 7/2002 | Chrumka | G08G 1/202 455/456.2 |

* cited by examiner

*Primary Examiner* — Chi H Pham
*Assistant Examiner* — Alexander O Boakye
(74) *Attorney, Agent, or Firm* — Inventive Patent Law P.C.; Jim H. Salter (57) ABSTRACT

Systems and methods for providing a caching model for in-vehicle infotainment systems with unreliable data connections are disclosed. A particular embodiment includes: receiving a service request from a client service consumer; forwarding the service request to both a host service as a remote request via a network access and to a local service as a local request without a network access; receiving a host service result from the host service via a network access in response to the service request; receiving a local service result from the local service without a network access in response to the service request; merging the host service result and the local service result to produce a composite result; and delivering the composite result to the client service consumer.

20 Claims, 8 Drawing Sheets

CACHING MODEL FOR IN-VEHICLE-INFOTAINMENT SYSTEMS WITH UNRELIABLE DATA CONNECTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2012-2013, CloudCar Inc., All Rights Reserved.

TECHNICAL FIELD

This patent document pertains generally to tools (systems, apparatuses, methodologies, computer program products, networks, etc.) for allowing electronic devices to share information with each other, and more particularly, but not by way of limitation, to a caching model for in-vehicle infotainment systems with unreliable data connections.

BACKGROUND

A variety of existing manufacturers provide connected electronic in-vehicle infotainment (IVI) systems, personal navigation devices (PND), and equivalent applications running on smart phones. However, with connected and PND systems today, services fail to operate when there is no data or network connection or no reliable data or network connection available, as is often the case when driving a vehicle. IVI and PND devices today function under the assumption that a data or network connection is either always required, or always unavailable, depending on the device design. There are no devices that work well in a "loosely connected" environment or an unreliable connection environment where data connections come and go.

For example, Google™ Map cannot provide search or guidance information when there is no data connection, although it can display a map by caching information related to a certain geographical area. Apple™ Siri cannot recognize navigation voice commands without a steady data connection. Pandora™ music stops or stutters when data or network connection is unreliable.

Some PND devices, such as devices from Garmin™ and TomTom™, do not use a data connection during operation. These types of devices are not considered "connected" devices and cannot offer the most up-to-date information and entertainment as a "connected" device does. Instead, these devices rely on local storage and processing, to provide static services for navigation and music, which can result in outdated information including incorrect maps and guidance.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

The various embodiments described herein relate to the field of connected electronic in-vehicle infotainment systems (IVI), personal navigation devices (PND), and equivalent applications running on smart phones. These devices use a connection to the Internet to provide dynamically updated features, such as maps, navigation, guidance, traffic, weather, news, productivity and entertainment information, in text, graphic, audio or video formats. These systems often include speech recognition functions for voice commands, and speech audio feedback.

As described in various example embodiments, systems and methods for providing a caching model for in-vehicle infotainment systems with unreliable data connections are described herein. In one example embodiment, the in-vehicle infotainment caching model can be used in or by the modular in-vehicle infotainment architecture illustrated in FIGS. 1 and 2 and described below. However, it will be apparent to those of ordinary skill in the art that the in-vehicle infotainment caching model described and claimed herein can be implemented, configured, and used in a variety of other applications and systems.

Particular example embodiments relate to a new in-vehicle infotainment hardware architecture, here traditional "automotive baseband" elements, such as displays, radio tuners, cameras, microphones, Controller Area Network (CAN) busses, general input/output signals, such as steering wheel switches and buttons, user-facing Universal Serial Bus (USB) ports are separated from an upgradeable multimedia module included in the in-vehicle infotainment caching architecture as described herein. In one example embodiment, the upgradeable multimedia module runs an Android™ Compatibility Definition Document (CDD) compliant Android™ operating system. The multimedia module is physically separate and has a single detachable connector, which allows the multimedia module to be easily exchanged as media technologies change or improve. The multimedia module can connect to the vehicle with a detachable connector with a specially-adapted electro-mechanical design. Standardizing an upgradeable multimedia module across automotive manufacturers would allow reduced cost and increased compatibility for future technology, allowing more desirable product and service offerings and revenue opportunities as technology progresses.

Figure 1:
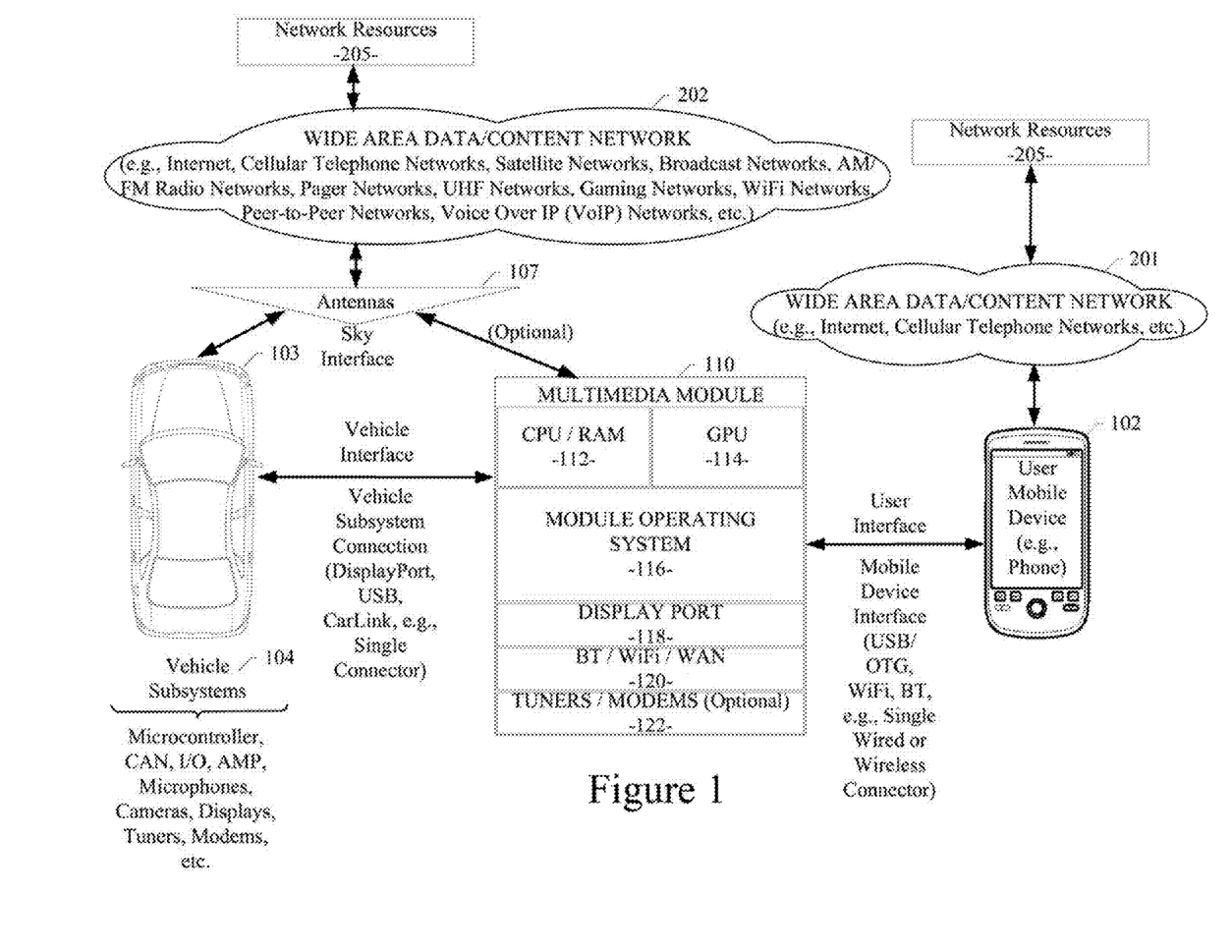
FIG. 1 illustrates a block diagram of an example modular in-vehicle infotainment architecture with an upgradeable multimedia module in which or with which embodiments described herein may be implemented.

Referring now to FIG. 1, example embodiments relate to a multimedia module 110 facilitating the communication of data signals and information and the activation of procedures and/or services between mobile devices 102, network resources 205 accessible via network 201, network resources 205 accessible via network 202 and the antennas 107, and vehicle subsystems 104 of as conventional vehicle 103. Embodiments disclosed herein generally provide the multimedia module 110 to enable the communication and control of data signals, information, and services between in-vehicle infotainment (IVI) subsystems of a vehicle, electronic control units (ECUs) of a vehicle, network-based mobile devices 102, such as mobile phones or mobile computing platforms, and network resources 205 accessible via the network 201 or network 202, such as server computers, websites, and the like. These network resources 205 are accessible via a conventional wide area network 201, such as the cellular telephone networks and/or the Internet and/or via a conventional wide area network 202, such as the cellular telephone networks, satellite networks, AM/FM radio networks, pager networks, UHF networks, other broadcast networks, gaming networks, WiFi networks, peer-to-peer networks, Voice Over IP (VoIP) networks, etc., and/or the Internet. In most cases, the cellular telephone networks tend to be more expensive to use than the broadcast networks. For example, it is less expensive and faster to stream media content (e.g., music or video selections) to a device via the broadcast networks as compared with the cellular networks. On the other hand, it is typically more efficient to use the cellular networks for phone calls. However, even among different cellular network providers there are often promotional rates or discounts offered by a particular cellular network provider at a particular point in time that are not offered by other cellular network providers. Thus, the embodiments described herein enable a user/subscriber to configure the system for automatic selection of the preferred network or mode of delivery of content and/or services to vehicle-connected mobile devices.

Generally, FIG. 1 depicts the communication of data signals between (from/to) the vehicle 103 subsystems 104, between the multimedia module 110, and hew en the mobile device(s) 102. Some of the data signals can be produced at the vehicle subsystems 104. The format of the data signals can be converted at the multimedia module 110, and the data signals can be further processed at the mobile device 102. For example, data signals communicated from the IVI subsystems or the ECUs of the vehicle 103 (e.g., vehicle subsystems 104) to the mobile devices 102 or network resources 205 may include information about the state of one or more of the components of the vehicle 103. In particular, the data signals, which can be communicated from the IVI subsystems or the ECUs to the CAN bus of the vehicle 103, can be received and processed by the multimedia module 110.

FIG. 1 depicts a system that includes a vehicle 103 with various vehicle subsystems 104. The systems and methods described herein can be used with substantially any mechanized system that uses a CAN bus as defined herein, including, but not limited to industrial equipment, boats, trucks, or automobiles; thus, the term "vehicle" extends to any such mechanized systems. The systems and methods described herein can also be used with any systems employing some form of network data communications.

The data signals communicated between the vehicle subsystems 104 and the multimedia module 110 may be formatted in a vehicle-specific format—i.e., specific to a vehicle 103 make and model. The vehicle-specific format generally refers to the format of the data signals for or from the vehicle subsystems 104. That is, the vehicle subsystems 104 may be manufactured by a first manufacturer that may have a vehicle-specific format for all its vehicle subsystems. Alternatively, the first manufacturer may have a vehicle-specific format for different models, years, option packages, etc. Generally, the vehicle-specific formats of different vehicle subsystems 104 may not be the same. Thus, a vehicle 103 manufactured by the first manufacturer typically has a different vehicle-specific format than a second vehicle 103 manufactured by a second manufacturer. Additionally or alternatively, in some embodiments, the data signals may be differential signals.

The multimedia module 110 couples with a detachable vehicle subsystem connector as part of a vehicle 103 subsystem connection associated with the vehicle subsystems 104. For example, as shown in FIG. 1, the vehicle subsystems 104 may have a single detachable connector that is adapted to connect with (and detach from) a connector of the multimedia module 110. Generally, the interface between the vehicle subsystems 104 and the multimedia module 110 includes a physical connection as well as an electrical interface such that the data signals communicated from/to the vehicle subsystems 104 may be further communicated to/from the multimedia module 110.

As shown in FIG. 1, the vehicle 103 subsystem connection and vehicle interface between the multimedia module 110 and the vehicle subsystems 104 can be implemented in a variety of ways. For example, one embodiment can use a modified DisplayPort interface. DisplayPort is a digital display interface developed by the Video Electronics Standards Association (VESA). The interface is primarily used to connect a video source to a display device such as a computer monitor, though the DisplayPort interface can also he used to transmit audio, USB, and other forms of data. As such, a modified DisplayPort interface can be used to manage the in-vehicle infotainment (IVI) subsystems of a vehicle 103 from the multimedia module 110. A DisplayPort module 118 is provided in the multimedia module 110 to support the modified DisplayPort interface. In another embodiment, the interface between the multimedia module 110 and the vehicle subsystems 104 can be implemented using a USB interface and associated connector. USB is an industry standard developed in the mid-1990's that defines the cables, connectors, and communications protocols typically used for connection, communication and power supply between electronic devices. In another embodiment, the interface between the multimedia module 110 and the vehicle subsystems 104 can be implemented using a CarLink interface. Some conventional CarLink interfaces are used to support remotely-startable vehicles. In any of these various embodiments, the vehicle 103 interface enables the multimedia module 110 to access the standard CAN bus in the vehicle 103. As a result, the multimedia module 110 can communicate with IVI subsystems or ECUs (e.g., vehicle subsystems 104) in the vehicle 103.

As shown in FIG. 1, the multimedia module 110 also couples with one or more mobile devices 102 as part of a mobile device interface supporting a user interface on the mobile device 102. In various embodiments, the mobile device interlace and user interface between the multimedia module 110 and the mobile devices 102 can be implemented in a variety of ways. For example, in one embodiment, the mobile device interface and user interface between the multimedia module 110 and the mobile devices 102 can be implemented using a USB interface and associated connector. In a preferred configuration, a USB On-The-Go, (USB OTG) interface can be used to enable the mobile devices 102 to act as a host device, USB OTG is a standard specification that allows USB devices such as mobile computing devices or mobile phones to act as a host, allowing other USB devices, like the multimedia module 110, to be attached to and communicate with them.

In another embodiment, the mobile device interface and user interface between the multimedia module 110 and the mobile devices 102 can be implemented using a wireless protocol, such as WiFi or Bluetooth (BT). WiFi is a popular wireless technology allowing an electronic device to exchange data wirelessly over a computer network. Bluetooth is a wireless technology standard for exchanging data over short distances. As shown in FIG. 1, a BT/WiFi/WAN module 120 is provided in the multimedia module 110 to support the WiFi or Bluetooth interface.

Referring still to FIG. 1, the multimedia module 110 can also communicate with network resources 205 via the network 202 and antennas 107. The network 202 represents a conventional cellular telephone network, satellite network, AM/FM radio network, pager network. UHF network, or other wireless broadcast network, gaming network, WiFi network, peer-to-peer network, Voice Over IP (VoIP) network, etc., that can be received in vehicle 103 via one or more antennas 107. Antennas 107 can serve to connect the multimedia module 110 with a data or content network 202 via cellular, satellite, radio, or other conventional signal reception mechanism. Such cellular data or content networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice Over IP (VoIP) networks, and the like are also well-known. Thus, as described in more detail below, the tuner module 122 of multimedia module 110 can include a radio receiver, a cellular receiver, and/or a satellite-based data or content modem to decode data and/or content signals received via radio signals, cellular signals, and/or satellite. As a result, the multimedia module 110 can obtain a data/content connection with network resources 205 via network 202, which is a connection independent of the data/content connection with network resources 205 via network 201.

Figure 2:
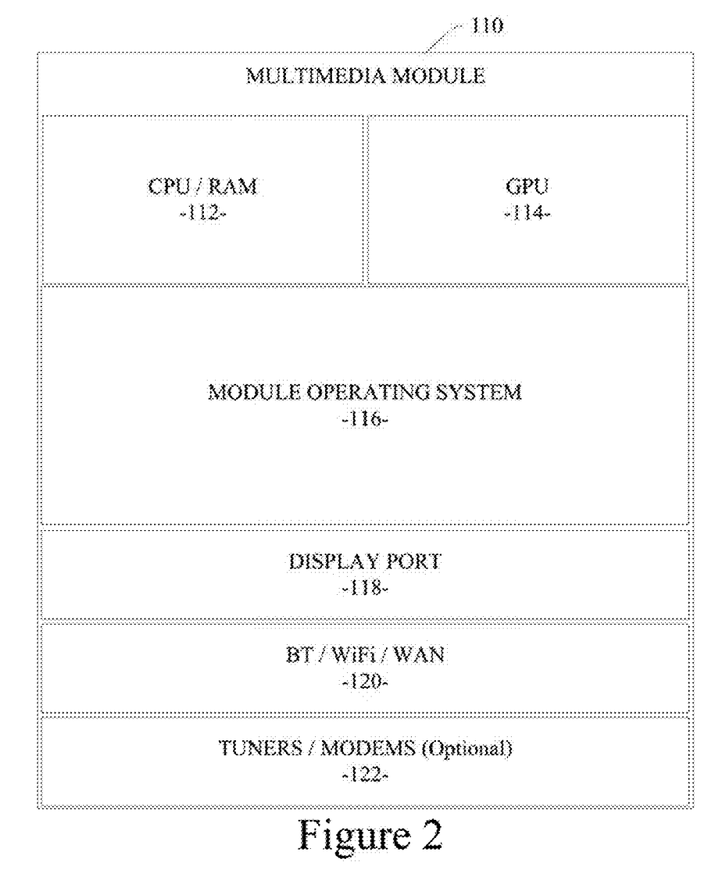
FIG. 2 illustrates the components of the multimedia module of an example embodiment.

Referring now to FIG. 2, the components of the multimedia module 110 of an example embodiment are illustrated. As described above, the multimedia module 110 can include a DisplayPort module 118 to support a modified DisplayPort interface between the vehicle subsystems 104 and the multimedia module 110. Similarly, the multimedia module 110 can include a BT/WiFi/WAN module 120 to support a WiFi or Bluetooth interface between the mobile devices 102 and the multimedia module 110. The multimedia module 110 can also include a central processing unit (CPU) 112 with a conventional random access memory (RAM). The CPU 112 can be implemented with any available microprocessor or application specific integrated circuit (ASIC). The multimedia module 110 can also include a graphics processing unit (GPU) 114 to support image processing of images transferred to the vehicle 103 display and/or other IVI subsystems, or images received from the camera and/or other IVI subsystems. The GPU 114 can be implemented with any conventional graphics processing unit. The multimedia module 110 can also include a module operating system 116, which can be layered upon and executed by the CPU 112 and GPU 114 processing platform. In one example embodiment, the module operating system 116 can be implemented using an Android™ Compatibility Definition Document (CDD) compliant Android™ operating system. It will be apparent to those of ordinary skill in the art that alternative operating systems and processing platforms can be used to implement the multimedia module 110.

Referring still to FIGS. 1 and 2, the multimedia module 110 can convert the data signals generated by a vehicle subsystem 104 from a vehicle-specific format to as mobile device data signal format defined by an Application Programming Interface (API). The multimedia module 110 can then securely and wirelessly (or via USB) transmit the data signals to the mobile device 102 and/or a network resource 205. By converting the data signals to the mobile device 102 format, the mobile device 102 may use the data signals without knowing the vehicle-specific format. Additionally, the mobile device 102 data signal format defined by the API exposes the data signals of the vehicle subsystems 104 (e.g., IVI, ECUs and other vehicle hardware and software) in a standardized way, thereby enabling multiple vendors or software developers to create mobile device applications that execute on the mobile device 102 and process the data signals from/to the vehicle subsystems 104. In the same way, the API can expose the data signals from/to the vehicle subsystems 104 in a standardized way for the network resources 205.

Additionally, a user of the mobile device 102 and/or a network resource 205 can send a write or control signal from the mobile device 102 and/or network resource 205 through the multimedia module 110 to a vehicle subsystem 104 via the CAN bus of the vehicle 103. The write/control signal enables the user of the mobile device 102 and/or network resources 205 to alter the state or monitor the state of one or more components of a vehicle subsystem 104. The write/control signal can be formatted in the mobile device 102 data signal format defined by the API and wirelessly (or via USB) transmitted to the multimedia module 110. The multimedia module 110 can convert the write/control signal to the vehicle-specific format and communicate the write/control signal to the appropriate component of a vehicle subsystem 104. By converting the write/control signal from the mobile device format defined by the API to the vehicle-specific format, the multimedia module 110 supports an interface with multiple vehicle 103 subsystems and multiple types of vehicles 103. Additionally, the mobile device 102 data signal format defined by the API acts as a common programming language enabling multiple vendors to write mobile device 102 applications and/or network resource 205 applications that may communicate read/monitor and write/control signals to/from multiple types of vehicle 103 subsystems and multiple types of vehicles independent of the model or manufacturer.

Referring again to FIGS. 1 and 2, the multimedia module 110 can optionally include a tuner or modem module 172. The optional tuner module 122 can include one or more radio tuners or modems that can generate audio or video streams, which can be played through IVI components of a vehicle subsystem 104. The multimedia module 110 can also optionally include one or more antennas 107, which can support the reception of wireless audio or video programming by the tuner module 122. Additionally, antenna 107 can serve to connect the multimedia module 110 with a data or content network via radio, cellular, and/or satellite signals. Thus, the tuner module 122 can include a radio receiver, cellular signal receiver, and/or a satellite-based data or content modem to decode data and/or content signals received via radio signals, cellular signals, and/or satellite. As a result, the multimedia module 110 of an example embodiment can source audio/video content, image/graphical content, or information content for IVI components of a vehicle subsystem 104 from mobile devices 102, network resources 205 via network 201, or network resources 205 via network 202 and its cellular network sources, radio network sources, and/or satellite/wireless broadcast sources directly via tuner/modem module 122 and an associated antenna 107. This content can be formatted for a particular vehicle subsystem 104 by the multimedia module 110 and transferred to the particular vehicle subsystem 104 via the vehicle interface described above.

In the example embodiment, the software components of the multimedia module 110 (e.g., the DisplayPort module 118, BT/WiFi/WAN module 120, and the module operating system 116) can be dynamically upgraded, modified, and/or augmented by use of the data connection with the mobile device 102 and the network resources 205. The multimedia module 110 can periodically query a network resource 205 for updates or updates can be pushed to the multimedia module 110.

Referring now to FIGS. 3 through 6, example embodiments illustrate the caching model of the example embodiment. As described above in various embodiments, user systems can include or be deployed on in-vehicle infotainment systems with unreliable data connections. Given that a vehicle can move into and out of various wide area networks 202 (shown in FIG. 1) and that data connectivity (and the quality of the data connectivity) is constantly changing, in-vehicle infotainment systems operate in an environment with unreliable data connections. Similarly, mobile devices 102 can move into and out of range relative to the multimedia module 110 and into and out of range of wide area networks 201. Thus, again, the in-vehicle infotainment systems and mobile devices operate in an environment with unreliable data connections. These unreliable data connections can result in data sources that become unavailable or data flows that are slow or corrupted. However, users of in-vehicle infotainment systems or other systems operating in an environment with unreliable data connections cannot tolerate the unavailability of data or the interruption of services, especially when the data or services or alternate forms of the data or services can be provided from alternate sources.

The example embodiments described herein solve this problem by use of an intelligent service-based caching model to obtain data for services when the data is obtainable (or the best available form of the data is obtainable) using the least expensive or best means available to retrieve information that is or will be of most interest to a particular user or client service. In the various example embodiments described below, several client system caching models are shown and described to illustrate the various scenarios handled by the service-based caching model of an example embodiment.

Figure 3:
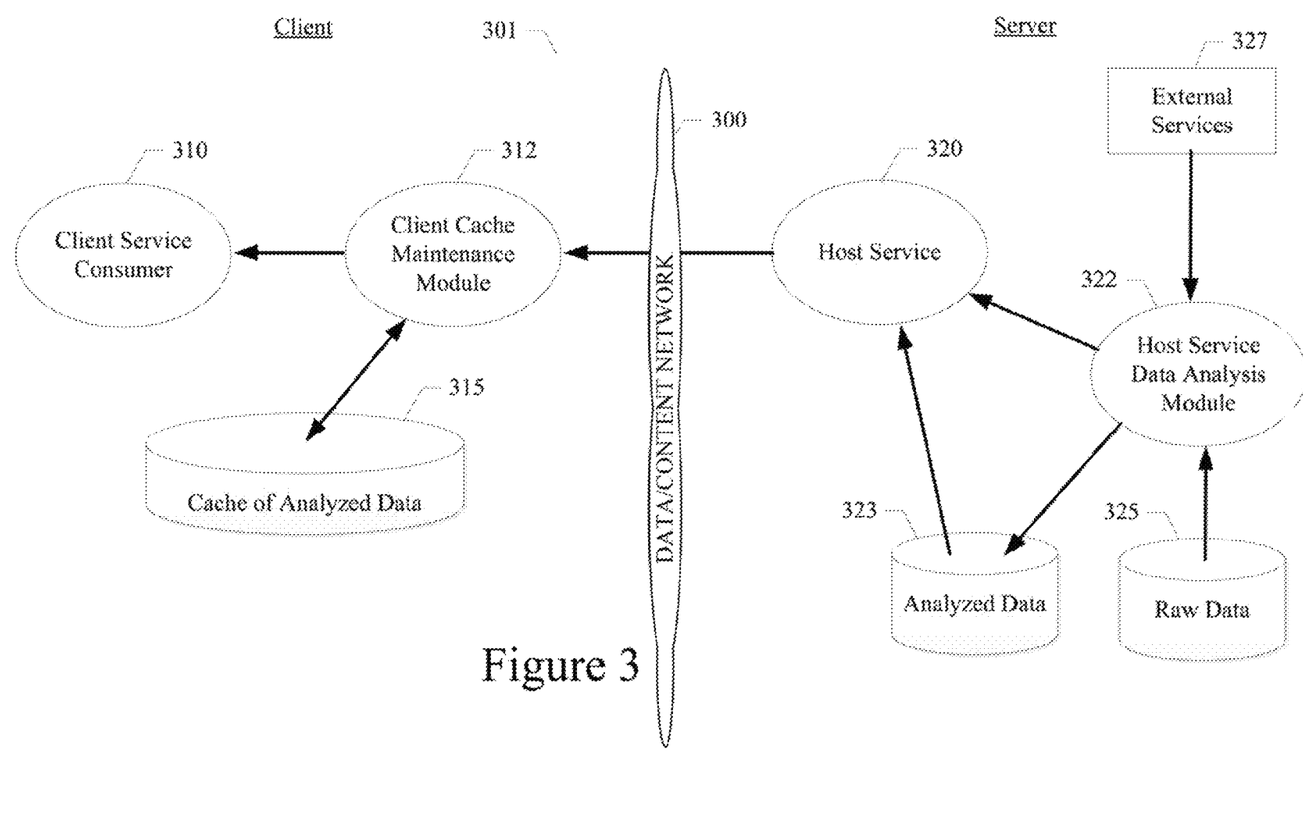
FIG. 3 illustrates an example caching model for data services with unreliable data connections in which a client service consumer can obtain analyzed data from a local (e.g., an internal or client-resident) source or a remote (e.g., an external or server-resident) source.

FIG. 3 illustrates an example caching model 301 for data services with unreliable data connections in which a client service consumer can obtain analyzed data from a local (e.g., an internal or client-resident) source or as remote (e.g., an external or server-resident) source. As shown in FIG. 3, a client service consumer 310 is present in a client-side user system. The client service consumer 310 can represent a variety of data service consumers including, but not limited to, a client software application program (app), a client system program, a browser, or other software system on a client platform that uses a data service. In many circumstances, the client service consumer 310 requires a special data set or processed data set from a host service 320 provided at a server system and accessible by the client system via a network communication across network 300. The host service 320 can have access to the more robust data processing power of a server system and external services 327, such as other networked service or data providers. The server system can include a host service data analysis module 322, which can retrieve data from the external services 327 or a raw data store 325, and ran analyze or process the data into a form that is more useful or efficient for the host service 320. The analyzed or processed data can be stored in an analyzed data store 323 by the host service data analysis module 322. The host service data analysis module 322 can also provide the processed data directly to the host service 320. The host service 320 can also retrieve the processed data from the analyzed data store 323.

When the network 300 separating the server system from the client system is operating efficiently and reliably, the client service consumer 310 can simply make a request to the host service 320 via a network 300 access and retrieve a response to the request from the host service 320 via another network 300 access. In this manner, the client service consumer 310 can obtain access to the analyzed data processed by the server system.

However, as described above, the embodiments described herein operate in an environment with an unreliable network data connection. As a result, the client service consumer 310 cannot assume that it will be able to access the analyzed data on the server system when needed. Thus, the example embodiment shown in FIG. 3 provides a client cache maintenance module 312 and an analyzed data cache 315 on the client system. The client cache maintenance module 312 can be configured to periodically request from the host service 320 a portion of the analyzed data from analyzed data store 323 or directly from host service data analysis module 322. The analyzed data retrieved from the server system by the client cache maintenance module 312 can be stored in the analyzed data cache 315. As described in more detail below, the client cache maintenance module 312 can also perform speculative fetching operations to retrieve data that will likely be used by a client service.

The client cache maintenance module 312 can also be configured to receive service requests from the client service consumer 310. If the network 300 is operating reliably, the client cache maintenance module 312 can pass the service request on to the host service 320 and return analyzed data to the client service consumer 310 in a response from the host service 320. When the data connection between the client system and the server system via network 300 is unreliable or lost completely, the client cache maintenance module 312 can process the service request from the client service consumer 310 without a network 300 access. The client cache maintenance module 312 can access analyzed data from the local analyzed data cache 315 and serve the data to the requesting client service consumer 310. Because the analyzed data in the analyzed data cache 315 has been periodically and speculatively updated by the client cache maintenance module 312, the analyzed data in the analyzed data cache 315 is reasonably current. The client cache maintenance module 312 can suppress the delivery of any stale data to the client service consumer 310. In this manner, the client cache maintenance module 312 can use the local analyzed data cache 315 to deliver all or a portion of the analyzed data to a client service consumer 310 in a client system without a network access if the network 300 becomes unreliable. This service-based caching model of an example embodiment provides a more consistent and satisfying user experience in environments with unreliable data network connections.

Figure 4:
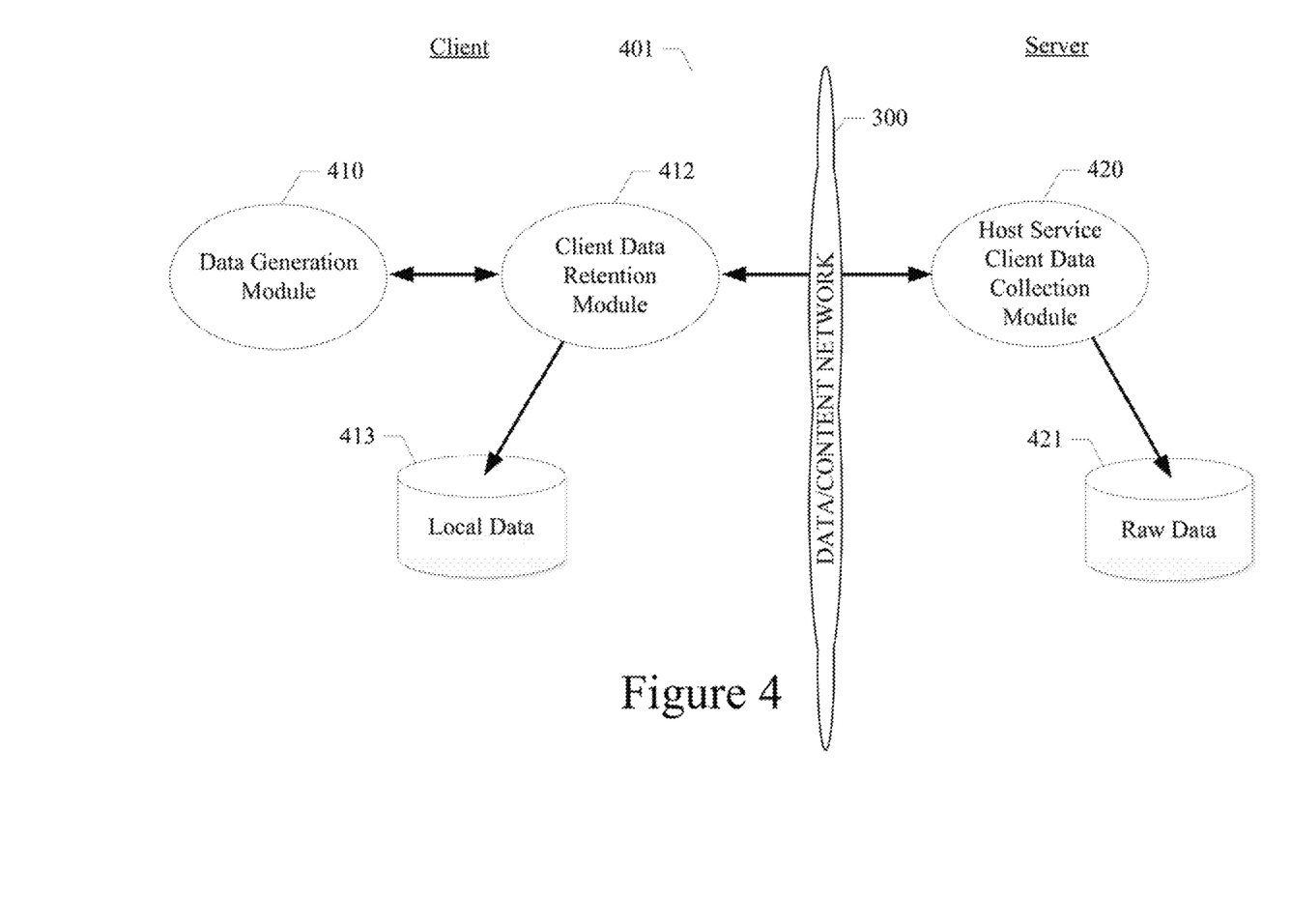
FIG. 4 illustrates another example caching model for data services with unreliable data connections in which a data generation module of a client service can provide data for a host service data collection module to support the host service or to support measurement of the service performance.

FIG. 4 illustrates another example caching model 401 for data services with unreliable data connections in which a data generation module of a client service can provide data for a host service data collection module to support the host service or to support measurement of the service performance. In the caching model of FIG. 4, a data generation module 410 of a client system can produce data that may be of use to a host service. For example, an app running on a client platform device may generate data (e.g., user location or user/client status data that a host service can use (e.g., for posting on a social network, for aggregating the data with other user data, or the like). In an example embodiment, a host service client data collection module 420 is provided at the server system to collect this client data and to store the data in a raw data store 421 for later processing or aggregation with other data. In a similar manner, client system or client service performance metrics or measurement data can be reported to the server system and stored in raw data store 421 by the host service client data collection module 420.

Because the embodiments described herein operate in an environment with an unreliable network data connection, the example caching model 401 also includes a client data retention module 412. As shown in the example embodiment of FIG. 4, the client data retention module 412 is resident at the client system and interposed between the data generation module 410 and the host service client data collection module 420. The client data retention module 412 is configured to receive data generated b the data generation module 410 and to transfer the received data to the host service client data collection module 420 via a network 300 data communication. Additionally, the client data retention module 412 can be configured to receive a data request from the host service client data collection module 420 via a network 300 data communication and to retrieve the requested data from the data generation module 410. The retrieved data can be transferred to the host service client data collection module 420 via a network 300 data communication. In this manner, the client data retention module 412 can serve as an intermediary between the data generation module 410 and the host service client data collection module 420. This intermediary role can serve an important purpose; because, the client data retention module 412 can also he configured to copy the data generated by the data generation module 410 to a local client-resident data store 413. As a result, the local data store. 413 can serve as an alternate local data resource for client services when the network 300 is inoperative and the host services and data store 421 are inaccessible.

Figure 5:
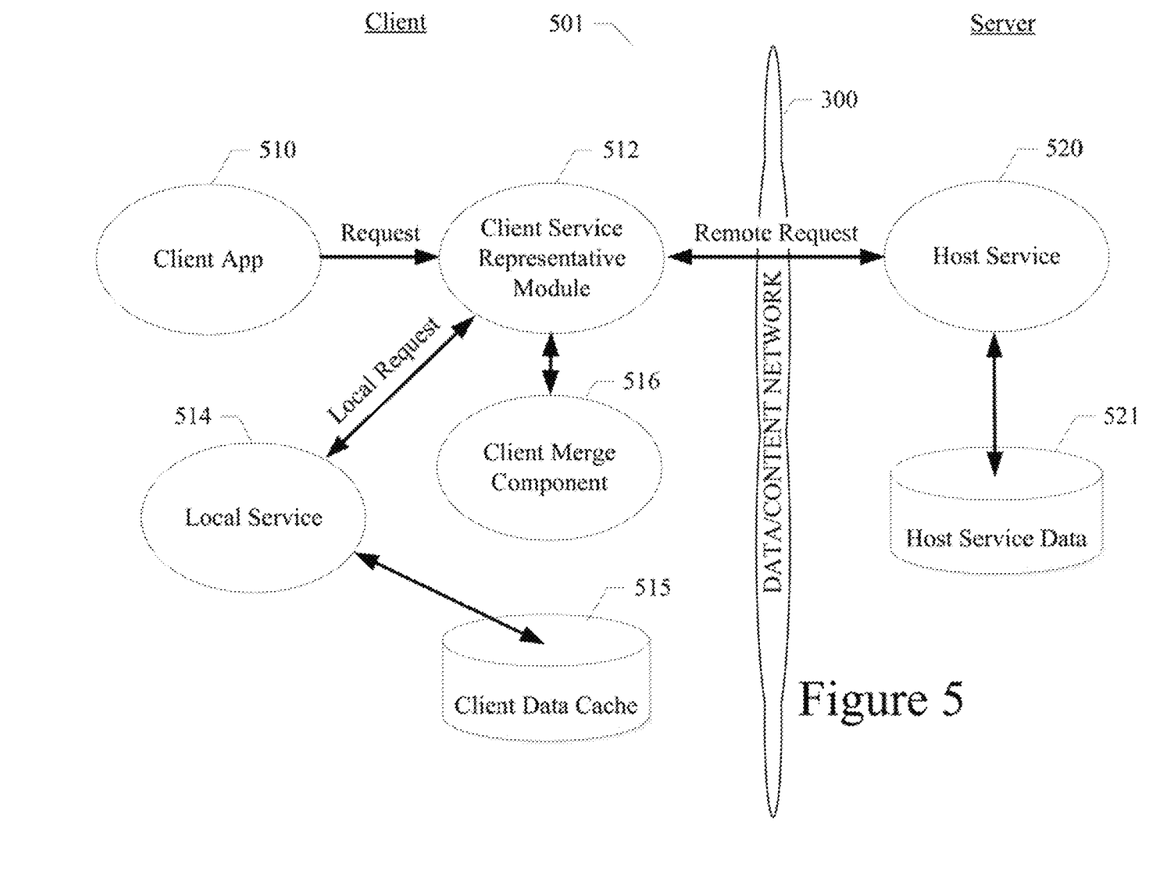
FIG. 5 illustrates an example caching model for data services with unreliable data connections in which a dual query hybrid service supports service components that are locally (e.g., internally or client-resident) resident and remotely (e.g., externally or server-resident) resident, wherein service requests are processed by both the local service component and the remote service component and the responses produced by each of the local service component and the remote service component are merged together and provided to a service consumer, such as a client software application program (app)

FIG. 5 illustrates an example caching model 501 for data services with unreliable data connections in which a dual query hybrid service supports service components that are locally (e.g., internally or client-resident) resident and remotely (e.g., externally or server-resident) resident, wherein service requests are processed by both the local service component and the remote service component and the responses produced by each of the local service component and the remote service component are merged together and provided to a service consumer, such as a client software application program (app). In the example embodiment of FIG. 5, a client application (app) 510 or other client service consumer is provided on the client system. Similarly, a host service provider 520 with a corresponding host service data store 521 is provided on a server system. The client system components can communicate with the server system components via a network 300 communication. Because the client system components are arranged on the opposite side of network 300 from the server system components, data requests sent between client system components and server system components are denoted herein as remote requests. In a conventional networked system, the client app 510 can communicate directly with the host service 520 via a network 300 communication. However, if data communication on network 300 is disrupted, the interaction of client system components and server system components is suspended. This suspension of service can be annoying for users and highly detrimental to a quality user experience.

The example embodiment shown in FIG. 5 provides a client service representative module. 512 to assist client services when network 300 data communication is unreliable. As shown in FIG. 5, the client service representative module 512 is resident at the client system and interposed between the client app 510 and the host service 520. The client service representative module 512 is configured to receive service requests generated by the client app 510 and to transfer the received service requests to the host service 520 as remote requests via a stet network 300 data communication. Additionally, the client service representative module 512 can be configured to receive a remote request from the host service 520 via a network 300 data communication and to transfer the host service 520 request to the client app 510. The response to the host service 520 request can be transferred from the client app 510 to the host service 520 via the client service representative module 512 and a network 300 data communication. In this manner, the client service representative module 512 can serve as an intermediary between the client app 510 and the host service 520.

Because the embodiments described herein can operate in an environment with unreliable network communications, the client service representative module 512 of the example embodiment can be configured to perform an additional function. The client service representative module 512 receives requests transferred between client app 510 and host service 520. These requests (or variations thereof) can also be transferred to a local service 514 as a local request that does not need a network 300 communication. Local service 514 can be configured to perform functions similar to the functions provided by host service 520. Typically, the functions provided by local service 514 might be less robust than the corresponding functions normally provided by host service 520. But, if network 300 communication is lost, it is better to provide a less robust service provided by local service 514 than to provide no service at all. A plurality of local services 514 can be provided on the client system as resources permit. These local services 514 can serve as back-up, alternate, or additional local services in support of host services that will be available if network 300 communication is lost.

In a dual query hybrid configuration, the client service representative module 512 of the example embodiment can be configured to receive a service request from client app 510 or other client service consumer as described above. However, in the dual query hybrid configuration, the client service representative module 512 forwards the service request to both the host service 520 as a remote request and to the local service 514 as a local request. Thus, the service request from client app 510 is converted to a dual request targeting both the host service 520 and local service 514. These dual requests are processed separately by the host service 520 and the local service 514, each service producing results in response to the request. The result produced by the host service 520 is denoted as the host service result. The result produced by the local service 514 is denoted as the local service result. As shown in FIG. 5, each of these results is returned to the client service representative module 512.

The client service representative module 512 of an example embodiment is configured to include a client merge component 516. The client merge component 516 receives the host service result and the local service result via the client service representative module 512. The client merge component 516 is configured to merge the host service result with the local service to produce a composite result. In an example embodiment, this merge operation can include combining non-conflicting data, deleting redundant data, preferring more recent data, preferring more accurate data, preferring more complete data, preferring more detailed data, preferring particular data items that are more consistent with related data items, and performing a variety of other operations configured to produce the most accurate and complete composite data set from a combination of the data from the host service result and the local service result. The merge operation can include an analysis of the result data content itself analysis of related metadata, and analysis of consistency between different data sets. As a result, the client merge component 516 produces an accurate and complete composite data set based on a combination of the host service result and the local service result. The composite data set is delivered to the client app 510 via the client service representative module 512 as the response to the original service request from client app 510.

Given the system configuration shown in FIG. 5 and described above, several benefits are realized. For example, if the network 300 is operating nominally and the host service 520 generates the most accurate and complete result in response to the service request from client app 510, the example embodiment enables the client app 510 to receive the best service that host service 520 can offer. However, if network 300 or host service 520 becomes unstable or unreliable, the example embodiment automatically fills all or a portion of the composite result with data from local service sources. As a result, operation of the client system is not suspended if the connection to network 300 or host service 520 is lost. Moreover, in some circumstances, the result data produced by the local services 514 may be better than the result data produced by the host service 520. In these circumstances, the client app 510 will receive the best result data produced by either the local services 514 or the host service 520. Thus, the example embodiment enables the client app 510 to receive the best result data produced by either or both of the local and remote sources.

As shown in FIG. 5, the example embodiment includes a client data cache 515. As described above, the client data cache 515 can be populated with service-related data from a host service and/or client-resident services or service consumers. For example, as shown and described above in connection with FIG. 3, the client data cache 515 can include various versions of analyzed data processed by the host service 520 and captured by a client cache maintenance component of the client service representative module 512. The client cache maintenance component can periodically retrieve analyzed data from host service 320 and store the analyzed data into the client data cache 515 as described above. As another example shown and described above in connection with FIG. 4, the client data cache 515 can include local data produced by a data generation module and captured by a client data retention component of the client service representative module 512. The client data retention component can store the local data into the client data cache 515 as described above. As described in more detail below, components of the client system can also perform speculative cache data fetches from local or remote data sources based on a variety of criteria, including current geographical location of the client system, temporal status, system status, user status, anticipated data requirements of particular services, anticipated data requirements of a particular user, a user's explicit preference profile, a user's implicit affinity based on demographics and/or usage history or behaviors, and a variety of other speculative cache data fetch criteria likely to populate the client data cache 515 with data actually used by one or more services. Thus, the client data cache 515 can include a variety of service-related data sourced from a variety of local and/or remote sources. This service-related data can be used by the local service 514 when the local service 514 produces the local service result in response to a service request from client app 510. Given that the client data cache 515 can be periodically and speculatively updated as described herein, the content of the client data cache 515 can be substantially similar to the content of data stores on the server system. Additionally, the client data cache 515 can be periodically updated by local services. As a result, the client data cache 515 can contain data content that is often as good as or better than the content provided by the remote sources. Moreover, access to the local service 514 and local client data cache 515 can often be performed taster than remote access via the network 300. Therefore, the example embodiments can provide an excellent user experience even if the network 300 or host service 520 is unreliable.

Figure 6:
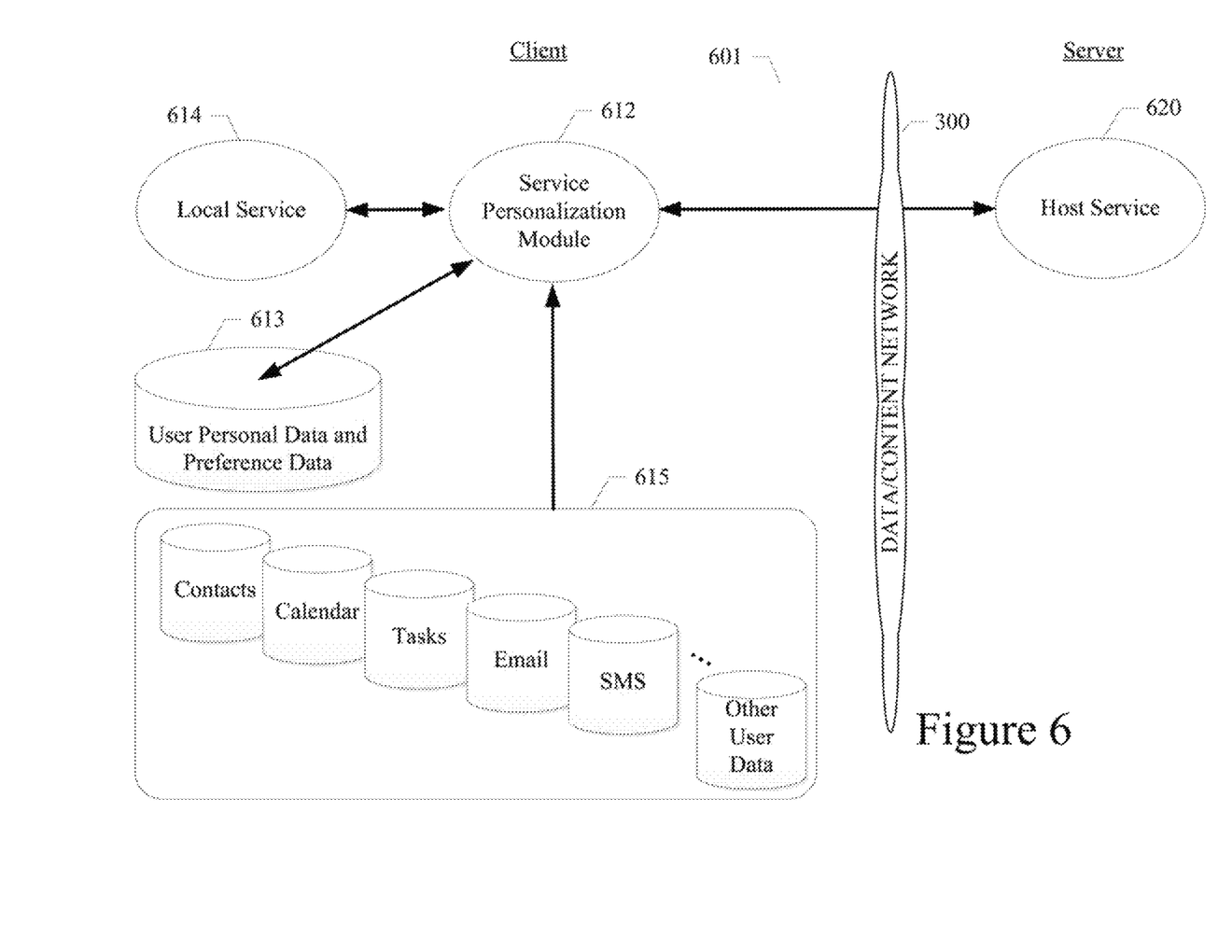
FIG. 6 illustrates an example caching model for data services with unreliable data connections in which a client service employs user personalization data obtained from a variety of sources to personalize or customize the operation of a service, including customizing the operation of the caching model used with the service.

FIG. 6 illustrates an example caching model 601 for data services with unreliable data connections in which a client service employs user personalization data obtained from a variety of sources to personalize or customize the operation of a service, including customizing the operation of the caching model used with the service. As shown in FIG. 6, an example embodiment includes a service personalization module 612. The service personalization module 612 can configure the operation of services and the caching model based on a variety of user-specific, client-specific, and/or service-specific characteristics. In one embodiment, the service personalization module 612 can mine or obtain personal information from a variety of user data sources 615 to enable local service 614 or host service 620 to personalize the operation of the service. In other words, the user data sources 615 can be used to cause services to operate in a manner most likely favored by a particular user. The user data sources 615 in an example embodiment can include user-specific data, such as user contacts, a user calendar, a user task list, email, Short Message Service (SMS) text messages, or other user data sources. Similarly, the user data sources 615 can include client-specific data, such as a list of resources available on the client system, client subsystem capabilities, client subsystem status, and the like. The user data sources 615 can also include service-specific data, such as such as at list of services available on the client system, a list of services known to be available on a remote system, service capabilities, service status, and the like. Additionally, user profile data or a user personal data and preference data set 613 can be provided. As well known to those of ordinary skill in the art, profile data for a particular user can be obtained and used to configure the operation of a data processing system. This user profile data can be assimilated into or augmented with the user personal data and preference data set 613. All of these information sources of the user data sources 615 and the user personal data and preference data set 613 can be used by the service personalization module 612 to configure service functionality to perform in a manner most likely favored by a particular user. For example, the service personalization module 612 can implement rules that configure a service to provide customized functionality (e.g., notifications, default user inputs, or the like) for a particular user in a manner that is either explicitly specified by a user or implicitly learned by the system from analysis of a history of specific user behaviors. Additionally, the service personalization module 612 can implement rules that configure a service to provide customized functionality for a particular client system based on the resources or configuration of the client system. Finally, the service personalization module 612 can implement rules that configure a service to provide customized functionality for interaction with other services of a local or remote system. In this manner, a client system can automatically adapt to the availability or absence of services on a dynamic basis.

In an example embodiment, the service personalization module 612 can also implement rules that configure a caching model of a client system to perform speculative cache data fetches from local or remote data sources. The speculatively fetched data can be stored in a client data cache 515 as shown in FIG. 5 and used in a manner as described above. The data can be speculatively fetched based on a variety of criteria, including current geographical location of the client system, the pre-set destination, temporal status, system status, user status, anticipated data requirements of particular services, anticipated data requirements of a particular user, a user's explicit preference profile, as user's implicit affinity based on demographics and/or usage history or behaviors, and a variety of other speculative cache data fetch criteria, likely to populate the client data cache 515 with data actually used by one or more services. For example, the service personalization module 612 can speculatively fetch data based on a pre-set destination in a vehicle navigation system, speculatively fetch data based on an item in a user's calendar, speculatively fetch data based on personal preferences of the user, speculatively fetch data based on the identity or type of a particular requested service, or the like. Additionally, the service personalization module 612 can speculatively fetch data based on a cost of a data connection to a server. In this example, the service personalization module 612 can be configured to initiate a network communication across an available low-cost WiFi channel, for example, rather than use a higher cost network channel, such as a cellular network channel. Additionally, the service personalization module 612 can be configured to initiate a network communication across an available network channel (only or by preference) at times of the day when data charges are less expensive. As a result of this speculative cache fetching, the client data cache 515 is more likely to contain data needed by local services if the network 300 or host service 620 should become unavailable or unreliable. Moreover, the speculative cache fetching is likely to be more cost effective.

In a particular embodiment, a server operating remotely in the server system can perform configuration operations on the service personalization module 612 by pushing various rule sets to the service personalization module 612 via a network 300 communication. These various rule sets can modify the manner in which the service personalization module 612 performs service personalization and customization as described above.

Thus, the caching model, of the various example embodiments is described. The described embodiments are particularly useful in client systems that can include or be deployed on in-vehicle infotainment systems with unreliable data connections. However, it will be apparent to those of ordinary skill in the art in view of the disclosure herein that the system can be deployed in a variety of applications. The caching model of the various embodiments can be deployed in the multimedia module 110 (see FIG. 1) described herein, in the mobile device 102, or a combination thereof.

As used herein, the term "CAN bus," refers to any bus or data communications system used in a vehicle 103 for communicating signals between an IVI system, ECUs, or other vehicle 103 components. The CAN bus may be a bus that operates according to versions of the CAN specification, but is not limited thereto. The term "CAN bus" can therefore refer to buses or data communications systems that operate according to other specifications, including those that might be developed in the future.

As used herein and unless specified otherwise, the term "mobile device" includes any computing or communications device that can communicate with the multimedia module 110 described herein to obtain read or write access to data signals, messages, or content communicated on a CAN bus or via any other mode of inter-process data communications. In many cases, the mobile device 102 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA) handheld computers, wearable computer, portable game console, other mobile communication and/or computing device, or an integrated device combining one or more of the preceding devices, and the like. Additionally, the mobile device 102 can be a computing device, personal computer (PC), multiprocessor system, microprocessor-based or programmable consumer electronic device, network PC, diagnostics equipment, a system operated by as vehicle 103 manufacturer or service technician, and the like, and is not limited to portable devices. The mobile device 102 can receive and process data in any of an variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the multimedia module 110 described herein to obtain read or write access to data signals, messages, or content communicated on a CAN bus or via any other mode of inter-process or networked data communications. In many cases, the network resource 205 is a data network accessible computing platform, including client or server computers, websites, mobile devices, peer-to-peer (P2P) network nodes, and the like. Additionally, the network resource 205 can be a web appliance, a network router, switch, bridge, gateway, diagnostics equipment, a system operated by a vehicle 103 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute as set (or multiple sets) of instructions to perform any one or more of the methodologies discussed herein. The network resources 205 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data networks 201, 202, and 300 (also denoted the network cloud) used with the network resources 205 can be configured to couple one computing or communication device with another computing or communication device. The network may be enabled to employ any form of computer readable data or media for communicating information from, one electronic device to another. The network 201 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 202 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4. Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The networks 201 and 202 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly.

The networks 201 and 202 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices, with various degrees of mobility. For example, the network may enable a radio connection through a radio network access, such as Global System for Mobile communication (GSM), General Packet Radio Services (GPM), Enhanced Data GSM Environment (EDGE), Wideband Code Division Multiple Access (WCDMA), CDMA2000, and the like. The network may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the networks 201 and 202 may include virtually any wired and/or wireless communication mechanisms by which information may travel between one computing device and another computing, device, network, and the like.

In a particular embodiment, a mobile device 102 and/or a network resource 205 may act as a client device enabling a user to access and use the multimedia module 110 to interact with one or more components of a vehicle subsystem 104. These client devices 102 or 205 may include virtually any computing device that is configured to send and receive information over a network, such as networks 201 and 202 as described herein. Such client devices may include mobile devices, such as cellular telephones, smart phones, tablet computers, display pagers, radio frequency (RE) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based, or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics ma be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML). Dynamic HTML, Handheld Device Markup Language (HDML), Wireless Markup Language (WML), WMLScript, JavaScript, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client, devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

Multimedia module 110 can be implemented using systems that enhance the security of the execution environment, thereby improving security and reducing the possibility that the multimedia module 110 and the related services could be compromised by viruses or malware. For example, multimedia module 110 can be implemented using a Trusted Execution Environment, which can ensure that sensitive data is stored, processed, and communicated in a secure way.

As stated above, the multimedia module 110 may receive data signals from the vehicle subsystems 104 that can be converted to a particular mobile device 102 format and/or a network resource 205 format defined by the API. The multimedia module 110 may then communicate the data signals formatted in the mobile device format to the mobile device 102. More specifically, in one example embodiment, the multimedia module 110 may be configured to wirelessly communicate the data signals in the mobile device format to the mobile device 102. The multimedia module 110 may include several configurations. Additionally in some embodiments, the multimedia module 110 may establish a secure channel between the multimedia module 110 and the mobile device 102. In addition to or as an alternative to the secure channel, the multimedia module 110 may encrypt the data signals formatted in the mobile device format. The mobile device 102 may decrypt the data signals. The inclusion of the secure channel and/or encryption may enhance security of the data signals communicated to the mobile device 102.

In embodiments in which the multimedia module 110 wirelessly communicates the data signals to the mobile device 102, the multimedia module 110 and the mobile device 102 can include wireless capabilities such as Bluetooth, WiFi, 3G, 4G, LTE, etc. For example, if the multimedia module 110 includes a Bluetooth transceiver as part of the BT/WiFi/WAN module 120, the multimedia module 110 can communicate wirelessly with the mobile device 102 using Bluetooth capabilities. Generally, the mobile device 102 includes one or more mobile device applications that process the data signals from/fur the multimedia module 110. The mobile device applications can produce a user interface with which a user may monitor and control the operation of vehicle subsystems 104 via the multimedia module 110 and the mobile device 102. The mobile device application may be loaded, downloaded, or installed on the mobile device 102 using conventional processes. Alternatively, the mobile device 102 may access a mobile device application via the network cloud 201, for example. The mobile device application may also be accessed and used as a Software as a Service (SaaS) application. The mobile device application may be written or created to process data signals in the mobile device 102 format rather than the vehicle-specific format. Accordingly, the mobile device application may be vehicle-agnostic. That is, the mobile device application may process data signals from any vehicle subsystem 104 once the data signals formatted in the vehicle-specific format are converted by the multimedia module 110.

By processing the data signals from the multimedia module 110 and the vehicle subsystems 104, the mobile device application may function better than a mobile device application without the data signals or may be able to provide functionality not possible without the data signals. For example, the mobile device applications may include a multimedia application. With the inclusion of the multimedia module 110 connected to the vehicle subsystems 104 as described herein, the multimedia application in the mobile device 102 may be used to monitor and control the IVI system in a vehicle 103.

Additionally or alternatively, the mobile device application may enable abstraction of data signals for aggregate uses. For some aggregate uses, the mobile device application may sync with one or more secondary systems (not shown). For example, the mobile device 102 may abstract data signals related to usage of the IVI system in a vehicle 103. The mobile device 102 may communicate with a secondary system that determines media consumption patterns based on the usage of the IVI system in the vehicle 103.

Examples of the mobile device applications are not limited to the above examples. The mobile device application may include any application that processes, abstracts, or evaluates data signals from the vehicle subsystems 104 or transmits write/control signals to the vehicle subsystems 104.

Figure 7:
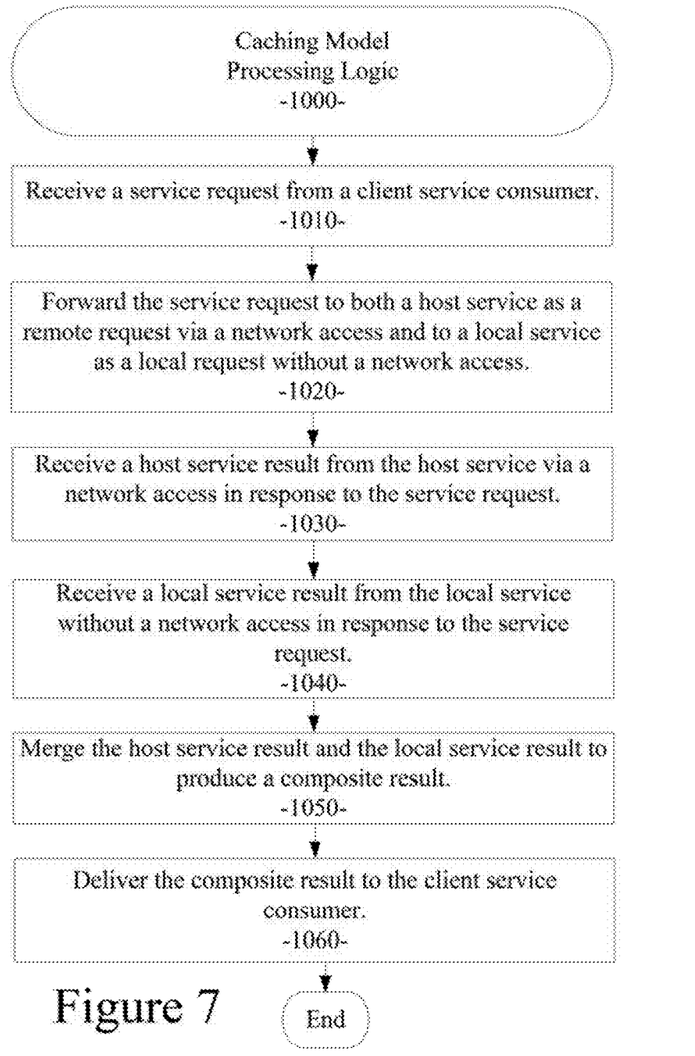
FIG. 7 is a processing flow chart illustrating an example embodiment of systems and methods for providing the caching model as described herein.

FIG. 7 is a processing flow diagram illustrating an example embodiment of systems and methods for providing a caching model for in-vehicle infotainment systems with unreliable data connections as described herein. The method 1000 of an example embodiment includes: receiving a service request from a client service consumer (processing block 1010); forwarding the service request to both a host service as a remote request via a network access and to a local service as a local request without a network access (processing block 1020); receiving a host service result from the host service via a network access in response to the service request (processing block 1030); receiving a local service result from the local service without a network access in response to the service request (processing block 1040); merging the host service result and the local service result to produce a composite result (processing block 1050); and delivering the composite result to the client service consumer (processing block 1060).

Figure 8:
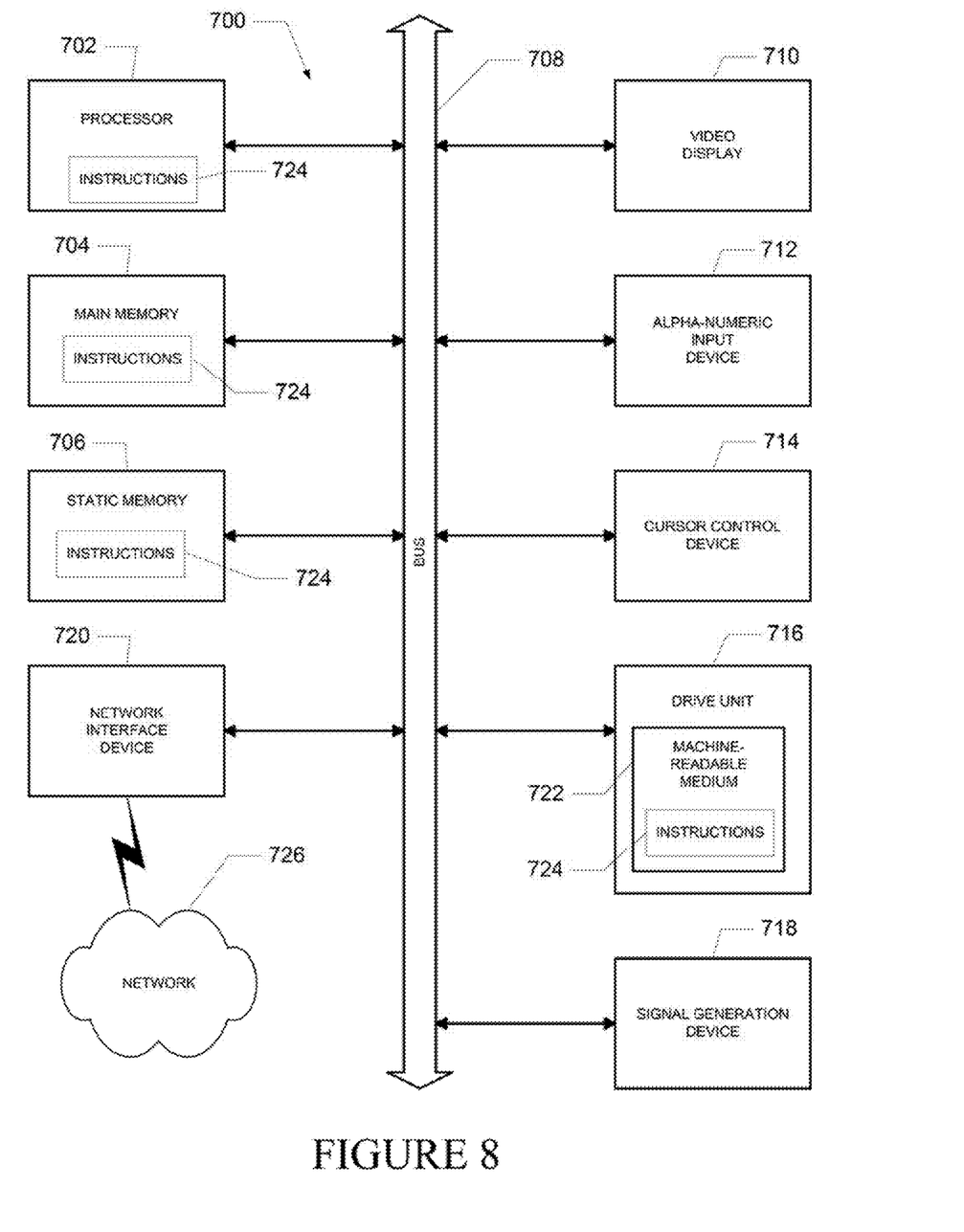
FIG. 8 shows a diagrammatic representation of machine in the example form of a computer system within which a set of instructions when executed may cause the machine to perform any one or more of the methodologies discussed herein.

FIG. 8 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., keyboard), a cursor control device 714 (e.g., a mouse), to disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 77) is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also he taken to include any non-transitory medium that is capable of storing, encoding or carrying a set of instructions for execution by the machine and that cause the machine to perform an one or more of the methodologies of the various embodiments, or that is capable of storing, encoding or carrying data structures utilized by or associated with such a set of instructions. The term "machine-readable medium" can accordingly be taken to include, but not he limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning, of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   receiving a service request from a client service consumer;
   forwarding the service request to both a host service as a remote request via a network access and to a local service as a local request without a network access;
   receiving a host service result from the host service via a network access in response to the service request;
   receiving a local service result from the local service without a network access in response to the service request;
   merging the host service result and the local service result to produce a composite result; and
   delivering the composite result to the client service consumer.

2. The method as claimed in claim 1 wherein the client service consumer is a client software application program (app).

3. The method as claimed in claim 1 wherein the local service operates in a device from the group consisting of: an electronic in-vehicle infotainment system (IVI), a personal navigation device (PND), a mobile device, and a smartphone.

4. The method as claimed in claim 1 further including retrieving analyzed data from the host service and storing the retrieved data into a client data cache.

5. The method as claimed in claim 1 further including retrieving data from the local service and storing the retrieved data into a client data cache.

6. The method as claimed in claim 1 wherein merging the host service result and the local service result includes performing a plurality of operations configured to produce an accurate and complete composite result from a combination of the data from the host service result and the local service result.

7. The method as claimed in claim 1 further including speculatively fetching data from the host service and the local service and storing the fetched data into a client data cache, the speculative fetching being based on personal information obtained from a variety of user data sources.

8. The method as claimed in claim 1 further including customizing the operation of a service based on personal information obtained from a variety of user data sources.

9. A client system comprising:
   one or more data processors;
   a client data cache; and
   a caching model, executable by the one or more data processors, to:
      receive a service request from a client service consumer;
      forward the service request to both a host service as a remote request via a network access and to a local service as a local request without a network access;
      receive a host service result from the host service via a network access in response to the service request;
      receive a local service result from the local service without a network access in response to the service request;
      merge the host service result and the local service result to produce a composite result; and
      deliver the composite result to the client service consumer.

10. The client system as claimed in claim 9 wherein the client service consumer is a client software application program (app).

11. The client system as claimed in claim 9 wherein the local service operates in a device from the group consisting of: an electronic in-vehicle infotainment system (IVI), a personal navigation device (PND), a mobile device, and a smartphone.

12. The client system as claimed in claim 9 being further configured to retrieve analyzed data from the host service and store the retrieved data into a client data cache.

13. The client system as claimed in claim 9 being further configured to retrieve data from the local service and store the retrieved data into a client data cache.

14. The client system as claimed in claim 9 being further configured to merge the host service result and the local service result by performing a plurality of operations configured to produce an accurate and complete composite result from a combination of the data from the host service result and the local service result.

15. The client system as claimed in claim 9 being further configured to speculatively fetch data from the host service and the local service and store the fetched data into a client data cache, the speculative fetching being based on personal information obtained from a variety of user data sources.

16. The client system as claimed in claim 9 being further configured to customize the operation of a service based on personal information obtained from a variety of user data sources.

17. A non-transitory machine-useable storage medium embodying instructions which, when executed by a machine, cause the machine to:

receive a service request from a client service consumer;
forward the service request to both a host service as a remote request via a network access and to a local service as a local request without a network access;
receive a host service result from the host service via a network access in response to the service request;
receive a local service result from the local service without a network access in response to the service request;
merge the host service result and the local service result to produce a composite result; and
deliver the composite result to the client service consumer.

18. The machine-useable storage medium as claimed in claim 17 wherein the client service consumer is a client software application program (app).

19. The machine-useable storage medium as claimed in claim 17 wherein the local service operates in a device from the group consisting of: an electronic in-vehicle infotainment system (IVI), a personal navigation device (PND), a mobile device, and a smartphone.

20. The machine-useable storage medium as claimed in claim 17 being further configured to retrieve analyzed data from the host service and store the retrieved data into a client data cache.

* * * * *